United States Patent [19]
Song

[11] Patent Number: 5,702,121
[45] Date of Patent: Dec. 30, 1997

[54] STRUCTURE FOR CONNECTING A STABLIZER BAR AND LOWER CONTROL ARM TO EACH OTHER

[75] Inventor: Jae Myong Song, Kyungsangnam-do, Rep. of Korea

[73] Assignee: Hyundai Motor Company, Rep. of Korea

[21] Appl. No.: 647,828

[22] Filed: May 15, 1996

[30] Foreign Application Priority Data

Dec. 15, 1995 [KR] Rep. of Korea ............. 95-50581

[51] Int. Cl.⁶ ................................................ B60G 21/00
[52] U.S. Cl. ..................... 280/689; 280/961; 280/723
[58] Field of Search ......................... 280/689, 96.1, 280/723

[56] References Cited

U.S. PATENT DOCUMENTS

| | | | |
|---|---|---|---|
| 4,113,278 | 9/1978 | Rissberger | 280/689 |
| 5,062,656 | 11/1991 | Hynds et al. | 280/689 |
| 5,064,216 | 11/1991 | Hynds | 280/689 |
| 5,102,160 | 4/1992 | Stowe | 280/689 |

*Primary Examiner*—Kenneth R. Rice
*Attorney, Agent, or Firm*—Finnegan, Henderson, Farabow, Garrett & Dunner, L.L.P.

[57] ABSTRACT

A structure for connecting a stabilizer bar and a lower control arm to each other, the structure includes a separate connecting member, elastic members, clamping bolts and nuts. The connecting member is composed of an upper fixture, a lower fixture and a supporter, and molded into one body with plastic materials. The elastic members are inserted on the inside of the fixtures. Bolts and nuts clamp both ends of the connecting member with the stabilizer bar and the lower control arm respectively.

6 Claims, 6 Drawing Sheets

FIG. 5
FIG. 6
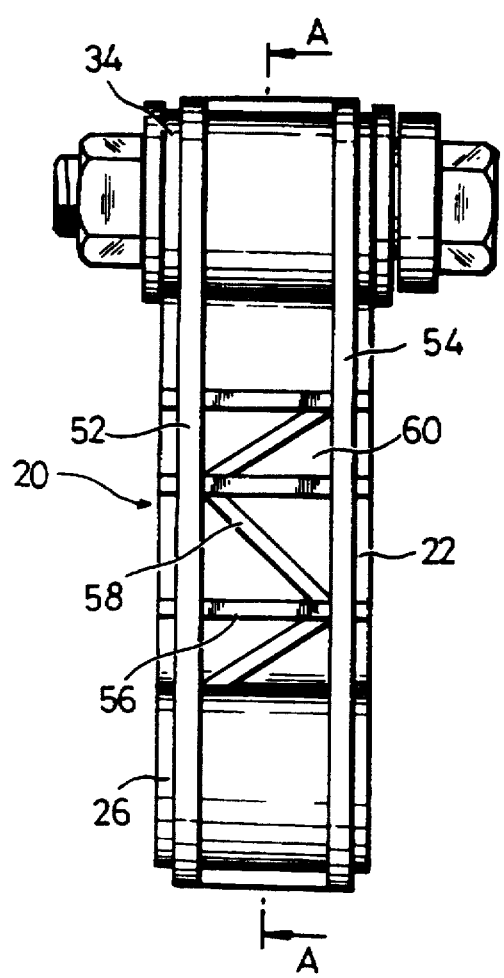
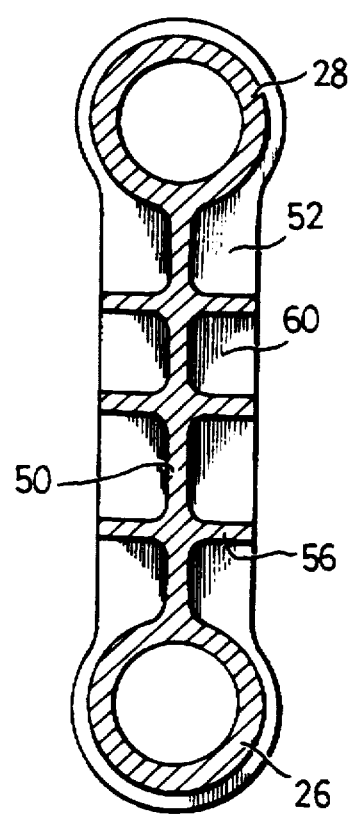

STRUCTURE FOR CONNECTING A STABLIZER BAR AND LOWER CONTROL ARM TO EACH OTHER

BACKGROUND

This invention relates to a structure for connecting a stabilizer bar and a lower control arm to each other, and more particularly, to a structure in which simple construction and small production costs are achieved by constructing connecting assemblies into one body.

The stabilizer bar is a kind of torsion spring which is applied to an independent suspension system of Wishbone or Macpherson type and uniformly keeps a vehicle's balance when the vehicle's inclination is increased during its turning.

When installing the stabilizer bar, its left and right ends are respectively connected to a lower control arm of a suspension system while its middle part is fixed on a vehicle body. Road conditions can be such to where positions of left and right wheels are not on the same line when this happens the stabilizer bar becomes twisted, and thereby minimizes the inclination of the vehicle body.

However, the conventional connection of the stabilizer bar and the lower control arm to each other has the problem of requiring a plurality of elastic members and a separate spacer, and so brings about very complicated constructions and high production costs.

SUMMARY

Accordingly, the present invention has been made in an effort to solve the above-described problem.

It is an object of the present invention to provide a structure for connecting a stabilizer and a lower control arm to each other which has a simple construction and bears small production costs.

To achieve the above objects, the present invention provides a structure for connecting the stabilizer bar and the lower control arm to each other which includes a connecting member, elastic members, clamping bolts and nuts. The connecting member includes a supporter, an upper fixture and a lower fixture. They are molded into one body with plastic materials. The upper and lower fixtures respectively have axial spaces and are formed on upper and lower ends of the supporter. The axial spaces cross at right angles to each other with a predetermined distance. Elastic members are inserted on the inside of the upper and lower fixtures. Bolts and nuts clamp both ends of the connecting member with the stabilizer bar and the lower control arm respectively.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 5 is a perspective view of a connecting member according to a second preferred embodiment of the present invention;

FIG. 6 is a sectional view along the line A—A of the FIG. 5; and

DESCRIPTION

Preferred embodiments of the present invention will now be described in detail with reference to the accompanying drawings.

Figure 1:
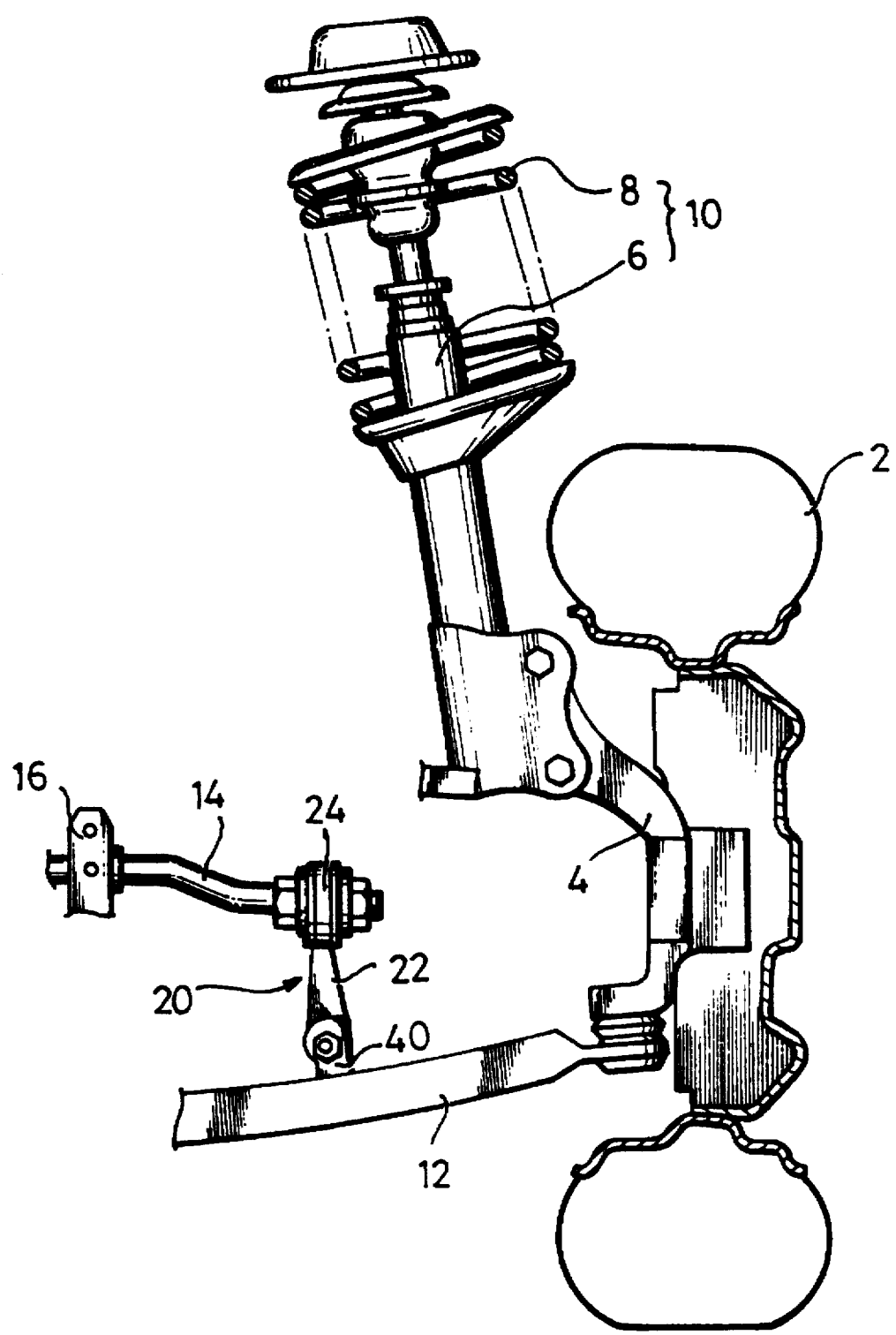
FIG. 1 is a view illustrating the Macpherson type of suspension system to which the present invention is applied.

FIG. 1 is a view illustrating the Macpherson type of suspension system to which the present invention is applied, and therein the symbol 2 indicates a wheel.

The wheel(2) is rotatably supported by a wheel supporter (4). The wheel supporter(4), is at its upper part, connected with a strut assembly(10) which is at its upper end, suspended with and supported by a wheel body and composed of a shock absorber(6) and a spring(8). The wheel supporter (4) is also, at its lower part, connected to the wheel body by way of a lower control arm(12) which is disposed in the direction of the vehicle length.

A stabilizer bar(14) applied to the suspension system like the above is made of a curved metallic bar and at its ends, connected to the lower control arm(12). The stabilizer bar is, at its middle part, fixed on the vehicle body(not illustrated) by a bracket(16).

The inventive stabilizer bar(14) is, at its ends, connected to the lower control arm(12) using a separate connecting member(20).

Figure 2:
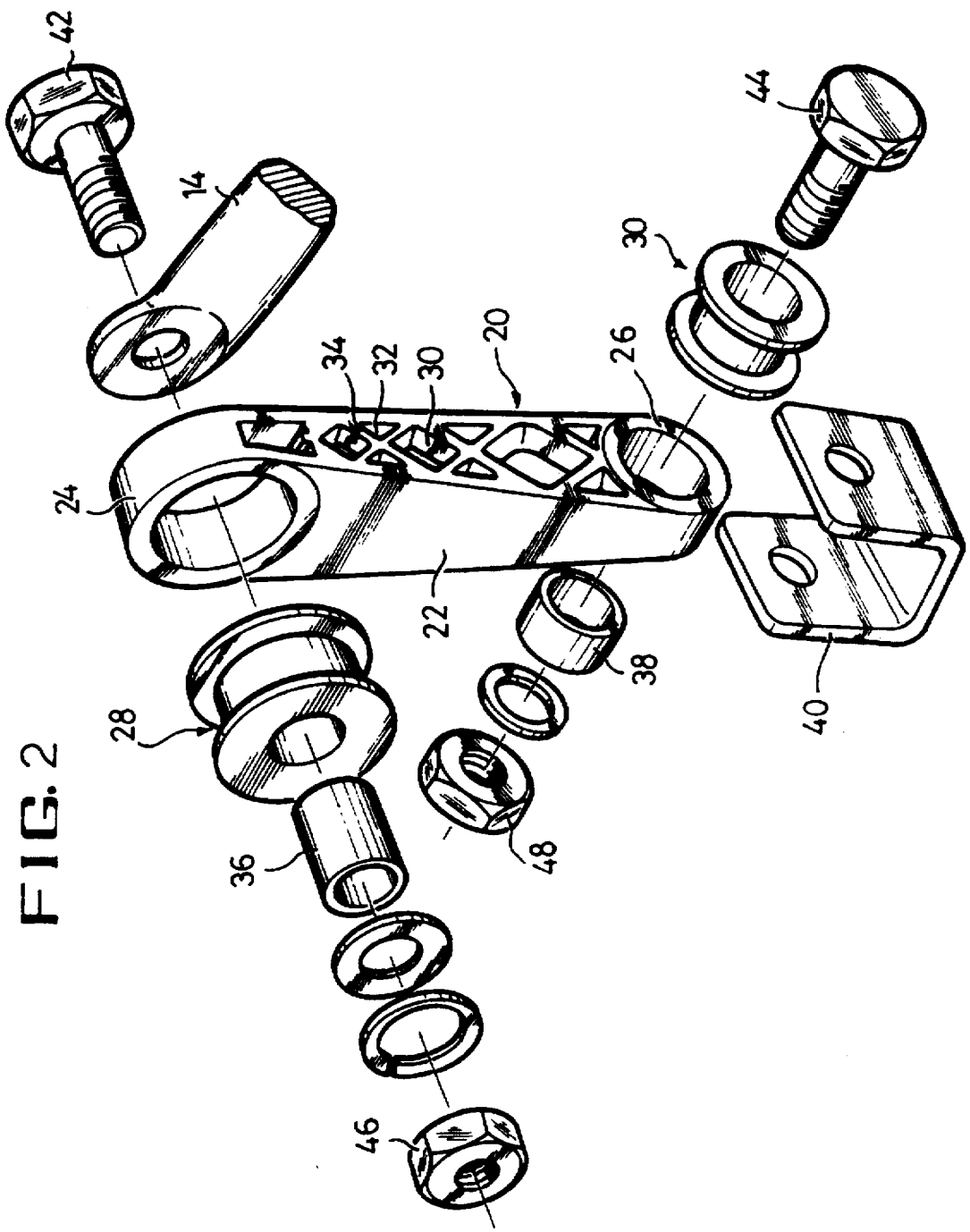
FIG. 2 is a main part exploded perspective view according to a first preferred embodiment of the present invention.

As shown in FIG. 2, the connecting member(20) is composed of a supporter(22) having a predetermined length, and fixtures(24, 26) having a cylindrical form. The fixtures are disposed on upper and lower ends of the supporter and shows axial spaces crossing at right angles. And, elastic members(28, 30) are respectively inserted into the axial spaces.

Figure 3:
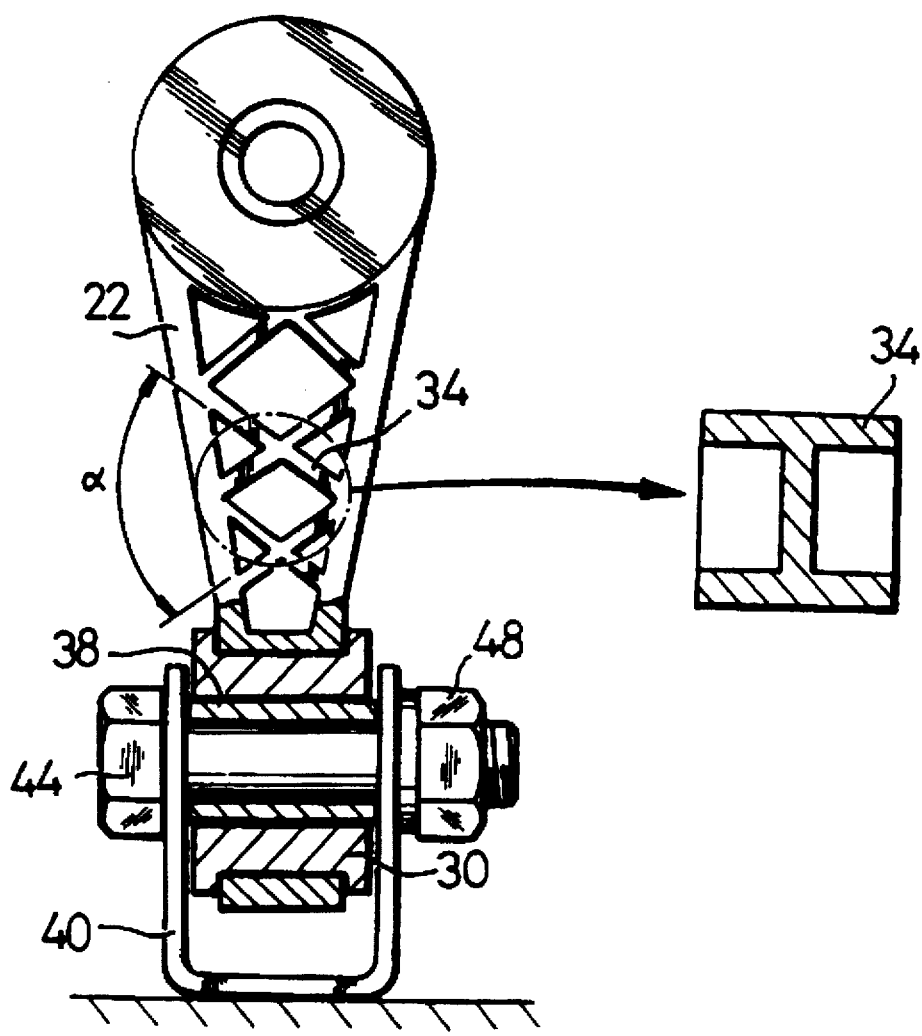
FIG. 3 is a sectional side elevation according to the first preferred embodiment of the present inventions.
Figure 4:
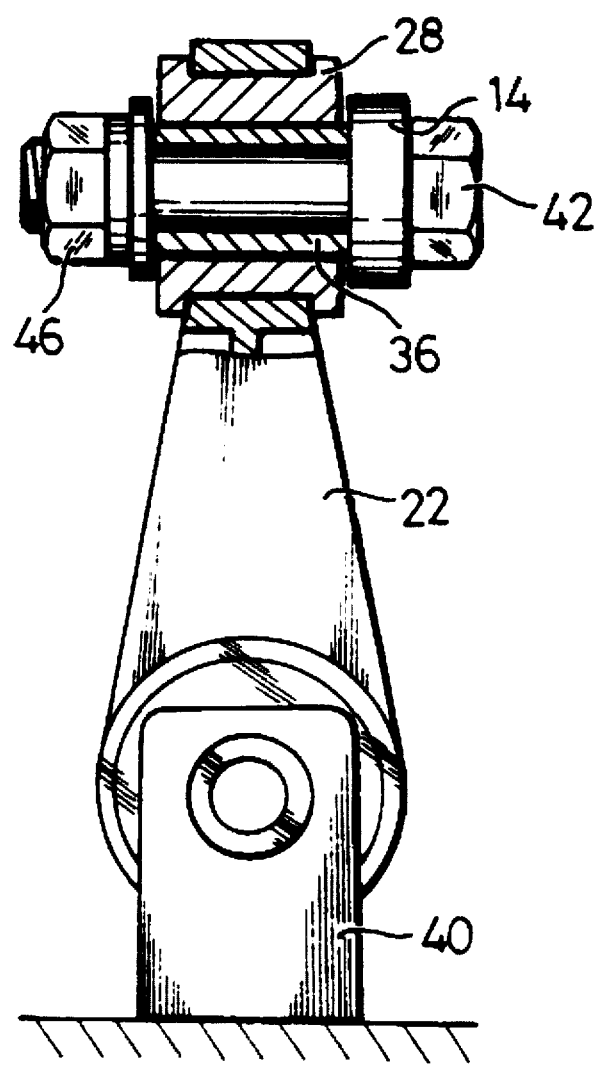
FIG. 4 is a rear elevation according to the first preferred embodiment of the present invention.
Figure 7:
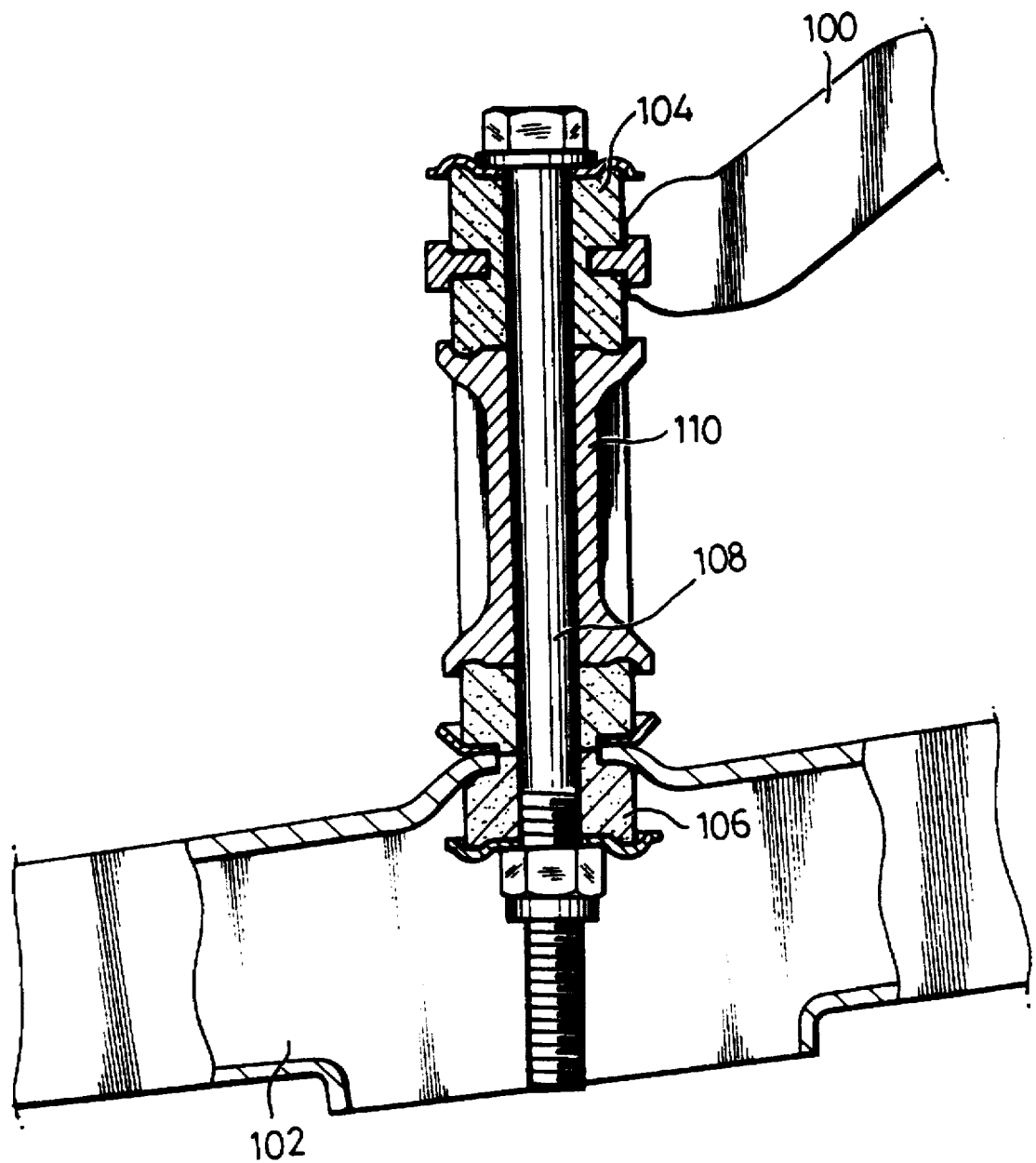
FIG. 7 is a combination sectional view of the conventional stabilizer bar.

There are several ways to constructing the supporter(22) on both ends of which the upper and lower fixtures(24, 26) are formed. However, as shown in FIGS. 3 and 4, the inventive supporter is constructed only by the way that horizontal circumferences of the upper fixture are on the same line with, but in their sizes larger than the upper and lower sides of the lower fixture, while horizontal circumferences of the lower fixture are on the same line with, but in their sizes smaller than the lateral sides of the upper fixture.

Therefore, while as seen from the lateral sides, the connecting member(20) seems like a reverse triangle, but as seen from the front and rear sides, it seems like a regular triangle.

The supporter(22) is at its central part formed with concaves having a diamond shape(30) the sizes of which are gradually reduced, and concaves having a triangle shape(32) which are respectively formed between the diamond shaped concaves(30). In addition, ribs having a diamond shape(34) are respectively formed on the boundary of the diamond shaped concave and the triangle shaped concave.

It is desirable that interior angles of the concave are respectively formed at 80 degrees.

In the construction like the above, it is possible to mold the connecting member(20) at one time with plastic materials having a high rigidity.

The shapes of the concaves(30, 32) need not be limited to a predetermined shape if the concavers structure bears enough of a rigidity to perform functions of the connecting member.

Also in the connecting member material, the material is not limited to plastics. That is, metallic material may be also used.

As described above, the inventive connecting member (20) connects the stabilizer bar(14) and the lower control arm(12) to each other and this connection is attained as shown below. The elastic members respectively receiving bushes(36, 38) are inserted on the inside of the upper and lower fixtures of the connecting member. In the connecting member containing the elastic members, the ends of the stabilizer bar and a bracket(40), fastened on the upper part of the lower control arm(12), are respectively clamped by bolts(42, 44) and nuts(46, 48), and thus the stabilizer bar and the lower control arm are connected to each other.

The elastic members(28, 30) are inserted between bolts and fixtures to absorb shocks. Rubber that is elastic is used as the material for the elastic members. The spring constant number of the elastic member is determined in accordance with the structure of the suspension system.

FIGS. 5 and 6 illustrate a connecting member according to the second preferred embodiment of the present invention. The connecting member includes a supporter in which axial spaces of upper and lower fixtures(24, 26) are on the same direction. The upper and lower fixtures(24, 26) are axially and linearly connected to each other by a connecting part(50). The lateral sides of the upper and lower fixtures, vertical to the axial direction, are connected to each other by longitudinal ribs(52, 54). The logitudinal ribs(52, 54) are, with uniform distances, connected to each other by a plurality of horizontal ribs(56). A plurality of inclined ribs(58) are formed in a zig-zag fashion between the horizontal ribs(56).

Therefore, concaves(60) which are formed with the horizontal ribs(56) and the inclined ribs(58) are on a symmetrical line with respect to the horizontal ribs(56).

What is claimed is:

1. A structure for connecting a stabilizer bar and a lower control arm to each other, the structure comprising:

a connecting member for connecting the stabilizer bar and the lower control arm to each other, the connecting member including a supporter, an upper fixture and a lower fixture, and being molded into one body with plastic materials;

the upper and lower fixtures having axial spaces respectively, the fixtures being respectively formed on upper and lower ends of the supporter and the spaces crossing at right angles each other with a predetermined distance;

elastic members which are inserted on the inside of the upper and lower fixtures;

bolts and nuts for clamping both ends of the connecting member with the stabilizer bar and the lower control arm respectively.

2. The structure of claim 1 in which the horizontal circumference of the one fixture in the supporter is, on the same plane, connected to both longitudinal ends of the other fixture.

3. The structure of claim 2 in which the supporter is, at its central part, formed with concaves having a diamond shape, the sizes of which are gradually reduced, concaves having a triangle shape which are respectively formed between the diamond shaped concaves, and ribs having a diamond shape which are respectively formed on the boundary of the diamond shaped concave and the triangle shaped concave.

4. The structure of claim 3 in which interior angles of the concave are respectively formed at 80 degrees.

5. The structure of claim 1 in which the connecting member comprises;

the supporter in which axial spaces of upper and lower fixtures are on the same direction;

the upper and lower fixtures being axially and linearly connected to each other by a connecting part;

lateral sides of the upper and lower fixtures, being, vertical to the axial direction, being connected to each other by longitudinal ribs;

the longitudinal ribs are, with uniform distances, connected to each other by a plurality of horizontal ribs;

a plurality of inclined ribs are formed in zig-zag pattern between the horizontal ribs.

6. The structure of claim 1 in which the connecting member is molded into one body with metallic materials.

\* \* \* \* \*